Patented Dec. 25, 1928.

1,696,419

UNITED STATES PATENT OFFICE.

HERMANN STAUDINGER, OF FREIBURG, GERMANY, AND THADEUS REICHSTEIN, OF ZURICH, SWITZERLAND, ASSIGNORS TO THE FIRM INTERNATIONALE NAHRUNGS- UND GENUSSMITTEL AKTIENGESELLSCHAFT, OF SCHAFFHAUSEN, GERMANY.

METHOD OF PRODUCING ARTIFICIAL COFFEE AROMA.

No Drawing. Application filed October 15, 1926, Serial No. 141,873, and in Germany November 4, 1925.

The subject matter of the present invention is a method of artificially producing the aroma of coffee by mixing substances known to be contained in the ethereal oil of roasted coffee or substances similar in action, either artificially produced or extracted from natural products, and also the application of the obtained products to impart the aroma of roasted coffee to other substances.

In spite of numerous and costly experiments the substances which are of importance for the production of the aroma are not definitely known. Up to the present the following substances have been determined in the aroma, i. e. in the so-called coffee oil and in the roasted products respectively: pyridine, furfur-alcohol, furfurol, maltol, acetone, acetic acid, valeric acid, which has been taken for methyl-ethyl-acetic acid, further quinol and phenols having the odour of creosote, i. e. substances which singly or in mixture produe no coffee aroma.

E. Erdmann considered a colourless oil containing nitrogen with a boiling point of 93° at 13 millimetres pressure to be the characteristic odoriferous substance of the aroma, whilst Bernheimer believed derivates of phenol, the so-called caffeol, to be the bearer of the odour. The presence of the following substances was assumed: pyrrol, furfurane, trimethyl-amine and methyl-amine, formic acid and resorcinol.

A novel method of isolating the aromatic principle contained in roasted coffee has been invented, see patent application Ser. No. 80,351, filed Jan. 9, 1926, and according to which large quantities of the aroma have been produced and analyzed. The result of this was that coffee oil consists of a mixture of a great many different substances; the most important substances have been isolated and identified and the desired knowledge of the composition of the aroma has thus been gained. The following compounds have been ascertained in the aroma: hydrogen sulphide, methyl-mercaptan, furfuryl-mercaptan and higher mercaptans, dimethyl-sulphide and higher sulphides, acetaldehyde, methylethyl-acetaldehyde, furfurol, methyl-furfurol, acetone, higher aliphatic aldehydes and ketones, ketones of the furane series, diacetyl- and acetyl-propionyl, oxy-sulphides and mercaptales of carbonyl compounds with the above mentioned mercaptans, methylalcohol, higher aliphatic alcolhols, acetol, furfuryl-alcohol, acetic acid, isovaleric acid and higher fatty acids, palmitic acid, esters of the former two acids with the mentioned alcohols, phenol, catechol, guaiacol, vinylguaiacol, 2,3-dioxyacetophenone, further phenols and phenol ethers of a higher valence, maltol, pyridine, pyracine, methyl-pyracine, 2,5 and 2,6 dimethyl-pyracine, higher homologues of pyracine, N-methyl-pyrrole, N-furfuryl-pyrrole, further higher pyrroles and derivates of furane and finally naphthalene.

These substances are to be found in the aroma of coffee in varying proportions and this explains the well known fact that the aroma of coffee widely varies in accordance with the kind of coffee and the method of roasting. A synthetic aroma may be produced by mixing together all the above mentioned substances, which may be obtained synthetically from other substances or from natural products; analogues and homologues may also be used.

The further research showed that some of the substances are of special importance for producing the aroma and in opposition to the old hypothesis these substances are not the phenols nor nitrogen compounds but fugitive sulphurous compounds of the mercaptan series of the general formula ASH or derivatives thereof, particularly oxy-sulphides of the formula

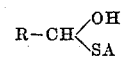

which may be obtained from carbonyl compounds, aldehydes, ketones and diketones with the above mentioned mercaptans.

It is to be observed that like or similar effects as those produced by the sulphur compounds found in the aroma of coffee may be obtained by synthetically manufactured products which are of a similar structure although not present in the natural aroma, for instance the particularly important furfuryl-mercaptan may be replaced by thienyl-mercaptan or benzyl-mercaptan; disulphides also show a similar effect.

The aroma is produced by an addition of the above mentioned sulphur-compounds, either singly or in mixture, to the other oxygen containing and nitrogen containing and other compounds found in the aroma of coffee. The different shades of the aroma of coffee may be obtained by varying the proportions of the mixture in many ways. It is not essential to add all the constituent parts found in the natural aroma, some of these substances suffice to obtain an aroma; the addition of a larger number of such constituents frequently only produces a blending and improvement of the aroma.

Also in these additions the products which are to be found in the natural aroma may be replaced extensively by analogous compounds which are not contained in the aroma, for instance vinyl-guaiacol may be replaced by eugenol, furfurol by propylaldehyde and so on; further cyclic diketones such as methyl-cyclopentenolone, thio-phenols, for instance thio-guaiacol, may advantageously be added; it is probable that such products are contained in the natural aroma. Further the odour of the mixture is changed by introducing hydrogen sulphide, which, as is known reacts with carbonyl compounds.

In the natural aroma are to be found alcohols and acids which react to form esters at elevated temperatures, so that besides the free compounds all these esters are also present, as well as the esters formed by the acids with the phenols and mercaptans. The formation of these esters in the mixture may also be caused by heating the mixture after the component parts have been brought together. Also the production of other components of the finished mixture may be caused by a chemical process, for instance hydrogen sulphide may be added to part of the mixture in the form of suitable salts; the latter are decomposed by acetic acid and other acids, whereby hydrogen sulphide is released and reacts thereupon with carbonyl compounds, the aroma being completely developed only after the mixture.

As the aroma of coffee is formed by a pyrogenous reaction, besides the above mentioned components various products of the latter's decomposition may be generated contributing to produce the aroma. For generating the latter it may be of advantage to heat the afore-mentioned mixture, eventually after diluting it, or to raise the temperature of a mixture of some constituents. Some substances may only be produced in the mixture after the heating, for instance the o-diketones, which are of importance for the aroma, may be produced by adding ketipinic acid and homologues, which are split up by the heat and form o-diketones, besides evolving carbonic acid.

The synthetic aroma may be produced either pure or may be mixed with solid or liquid diluting agents. It may be obtained by mixing one part of the components with a diluting agent, another part with another diluting agent and then only producing the final composition, which process often favours the development of the aroma. Further one or several parts may be added in the form of vapour. In particular hydrogen sulphide is either introduced into the finished aroma, eventually after diluting same, or into single constituents, for instance into carbonyl compounds, whereupon the other substances are added.

Summing up the above statements, the characteristic feature of the method of producing a synthetic coffee aroma consists in mixing fugitive mercaptans and their derivatives to single oxygen and nitrogen containing compounds, or to a mixture of these, or other above-named compounds.

As has just been described, one obtains coffee aroma strictly synthetically, which is intended to be utilized for aromatizing other substances, for instance food, table-luxuries, and particularly coffee surrogates. In a great many food and table-luxuries and chiefly after they have been roasted, similar compounds as contained in the coffee aroma are present and only the sulphur compounds which are especially characteristic for the production of the aroma are missing. In order to impart the aroma of roasted coffee to such coffee surrogates and to other foods and table luxuries it is therefore in many cases only necessary to add one or more of the above mentioned mercaptans or derivatives thereof in a suitable dilution. Obviously a fine shading of the aroma may be attained by an addition of further substances.

The aromatizing of foods and delicacies may be realized by adding the prepared aroma i. e. a mixture of above-named substances, applying it either as a fluid or as a vapour, or in combining both methods, or by adding suitable diluting agents. In all cases the following procedure may be adopted: one impregnates one part of the product to be aromatized with one or more of the components of the mixture, another part with another component, and by mixing both these parts develop the aroma. For instance it may be advantageous to impregnate a portion of the product to be aromatized with carbonyl compounds, another portion with sulphur compounds and to complete the aroma by a subsequent mixture of the two impregnated portions. Also in this case the operating process which has been mentioned above for producing the aroma may be applied which means that the formation of the substances important for the aroma may be caused by a chemical process.

With a mixture so complex and varying in composition as the natural aroma, it is most difficult to reproduce the different tastes of different kinds of coffee by a synthesis. One may therefore proceed by adding to the synthetic mixture small quantities of natural aroma substances or in special cases roasted coffee, obtaining thus, also in this mixture, the natural coffee aroma.

*Examples.*

1. 6 parts of acetyl-propionyl, 4 parts of methyl-ethyl-acetaldehyde, 4 parts of acetaldehyde, 4 parts of furfurol and 0.4 parts of methyl-mercaptan are mixed together. Thereupon hydrogen sulphide is passed into the mixture during a short time, during which the mixture may be diluted with acetone or alcohol, fats or oils.

2. 1 part of methyl-$\alpha$-oxy-ethyl-sulphide (i. e. the reaction product of equimolar quantities of methyl-mercaptan and acetaldehyde), 1 part of benzyl-$\alpha$-oxy-benzyl-sulphide, 5 parts of furfuryl-disulphide are dissolved in 100 parts of the purest rape-seed oil. To this is added a mixture of 0.6 parts of diacetyl, 2 parts of acetyl-propionyl, 1 part of acetaldehyde, 1 part of isobutyl-aldehyde, 2 parts of $\alpha$-methyl-furfurol, 0.4 parts of naphthalene, 2 parts of isovaleric acid, 1 part of phenol, 0.5 parts of iso-eugenol, 0.5 parts of guaiacol, 0.5 parts of $\alpha$-methyl-cyclopentenolone, 3 parts of pyridine, 1 part of N-methyl-pyrrole and 1 part of N-furfuryl-pyrrole.

3. One mixes: 1 part of diacetyl, 4 parts of acetyl-propionyl, 4 parts of methylethyl-acetaldehyde, 3 parts of acetaldehyde, 2 parts of $\alpha$-methyl-furfurol, 1 part of furfurol, 3 parts of pyridine, 2 parts of isovaleric acid, 1 part of phenol, 1 part of iso-eugenol, 0.5 parts of guaiacol, 0.5 parts of $\alpha$-methyl-cyclopentenolone, 0.6 parts of methyl-mercaptan, 0.3 parts of furfuryl-mercaptan, 0.3 parts of N-octyl-alcohol, 0.4 parts of thioguaiacol.

4. Of the afore-mentioned mixture approximately 2-10 parts are used for aromatizing 1000 parts of food or table-luxuries, for instance 3 parts of the mixture of number 3 are dissolved in 10 parts of rape-seed oil and are intimately mixed with 100 parts of corn coffee or of chicory and further 1000 parts of coffee surrogates added.

The impregnation may also be realized by letting 3 parts of the aroma in vapour form instead of the finished mixture act on 1000 parts of coffee surrogate, or by mixing the heavy components after their dilution, with rape-seed oil, and letting the volatile parts act in vapour form. In this proceeding it is advisable to bring either the sulphur compounds or the oxygen or nitrogen compounds to react in vapour state. During the mixing the aroma is developed.

5. 1 part of kepitinic acid, 12 parts of methyl-ethyl-glycidic acid, 1 part of furfurol, 4 parts of acetyl-propionyl, 2 parts of methyl-furfurol, 2 parts of isovaleric acid are cautiously distilled. To the product of distillation are added 0.2 parts of thionyl-mercaptan, 0.6 parts of methyl-mercaptan, 5 parts of acetaldehyde, 2 parts of eugenol, 0.6 parts of o-cresol, 0.3 parts of nonyl-aldehyde and 0.2 parts of nonyl-alcohol, 1 part of furfuracroleine, 1 part of furfur-alcohol-acetate, 0.5 parts of methyl salicylate, 15 parts of acetic acid, 3 parts of a pyridine-pyrazine mixture produced from glycerine with ammoniumchloride, 100 parts of an extract of chicory, 5000 parts of 80% alcohol containing 0.1 part of sodium sulphide. The solution is distilled. To the product of distillation 100 parts of roasted and ground coffee are added and after the mixture has been left to stand for one day it is distilled again. The thus produced coffee essence is intended for the production of mocca liqueur or for perfuming purposes; its strength corresponds approximately to 100000 parts of natural coffee.

6. 100000 parts of corn coffee are subjected to the action of vapours of methyl-mercaptan and furfuryl-mercaptan until the aroma has developed; 0.3 parts of furfuryl-mercaptan and 0.5-0.8 parts of methyl-mercaptan are sufficient for the purpose. The aromatizing may also be carried out at moderate temperatures, for instance at 50-60° and it is of course essential to mix the products well during the treatment.

We claim:

1. A method of producing artificial coffee aroma, comprising mixing fugitive mercaptans and sulphides derived therefrom and reacting therewith upon the oxygen-containing and nitrogen-containing and other compounds present in the natural coffee aroma.

2. A method of producing artificial coffee aroma, comprising mixing fugitive mercaptans and $\alpha$-oxysulphides derived therefrom with the oxygen-containing and nitrogen-containing and other compounds present in the natural coffee aroma.

3. A method of producing artificial coffee aroma, comprising mixing fugitive mercaptans and disulphides derived therefrom and reacting therewith upon the oxygen-containing and nitrogen-containing and other compounds present in the natural coffee aroma.

4. A method of producing artificial coffee aroma, comprising forming a mixture of fugitive mercaptans and of sulphides derived therefrom and reacting with this mixture with oxygen-containing and nitrogen-containing and other compounds present in the natural coffee aroma.

5. A method of producing artificial coffee aroma, comprising mixing with the aid of diluting agents fugitive mercaptans and sulphides derived therefrom and reacting therewith the oxygen-containing and nitrogen-containing and other compounds present in the natural coffee aroma.

6. A method of producing artificial coffee aroma, comprising mixing fugitive mercaptans and sulphides derived therefrom and reacting therewith oxygen-containing and nitrogen-containing and other compounds present in the natural coffee aroma, some of the parts being in vapour state.

7. A method of producing artificial coffee aroma, comprising mixing fugitive mercaptans and sulphides derived therefrom and reacting therewith oxygen-containing and nitrogen-containing and other compounds present in the natural coffee aroma and causing hydrogen sulphide to act on the resulting product.

8. A method of producing artificial coffee aroma, comprising mixing fugitive mercaptans and sulphides derived therefrom and reacting therewith the oxygen-containing and nitrogen-containing and other compounds present in the natural coffee-aroma, and causing hydrogen sulphide to act on single portions of the resulting product.

9. A method of producing artificial coffee aroma, comprising mixing with the aid of diluting agents fugitive mercaptans and sulphides derived therefrom and reacting therewith the oxygen-containing and nitrogen-containing and other compounds present in the natural coffee-aroma and causing hydrogen sulphide to act on the resulting product.

10. A method of producing artificial coffee-aroma, comprising mixing fugitive mercaptans and sulphides derived therefrom and reacting therewith the oxygen-containing and nitrogen-containing and other compounds present in the natural coffee-aroma, reacting compounds being chemically produced during the reaction in the reacting mass.

11. A method of producing artificial coffee aroma, comprising mixing fugitive mercaptans and sulphides derived therefrom and reacting therewith the oxygen-containing and nitrogen-containing and other compounds present in the natural coffee aroma, and adding to the product obtained substances produced from coffee.

12. In the method of producing artificial coffee aroma, the step which comprises reacting with a mercaptan compound upon other compounds present in coffee and primarily containing oxygen and nitrogen.

13. The method of producing artificial coffee aroma which comprises reacting with mercaptans and their α-oxy-sulphides and disulphides upon other compounds contained in coffee and primarily containing oxygen and nitrogen.

14. The method of producing artificial aroma for coffee surrogates, which comprises impregnating a coffee surrogate with one or more mercaptan compounds such as are present in coffee and reacting thereon with one or more organic compounds containing at least one carbonyl group.

15. The method of producing artificial aroma in coffee surrogates, which comprises impregnating a portion of such surrogate with one or more mercaptan compounds such as are usually present in natural coffee and another portion of such surrogate with one or more organic compounds containing at least one carbonyl group and mixing the portions for reaction of the compounds.

In testimony that we claim the foregoing as our invention, we have signed our names.

HERMANN STAUDINGER.
THADEUS REICHSTEIN.